Figure 5:
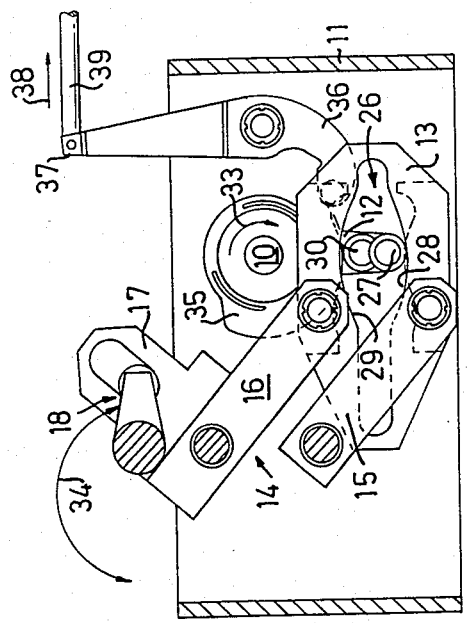

United States Patent [19]

Westman

[11] Patent Number: 4,538,721
[45] Date of Patent: Sep. 3, 1985

[54] CONVEYOR

[75] Inventor: Jan-Erik Westman, Sölvesborg, Sweden

[73] Assignee: AB Volvo, Gothenburg, Sweden

[21] Appl. No.: 453,861

[22] PCT Filed: Apr. 13, 1982

[86] PCT No.: PCT/SE82/00121
§ 371 Date: Dec. 9, 1982
§ 102(e) Date: Dec. 9, 1982

[87] PCT Pub. No.: WO82/03589
PCT Pub. Date: Oct. 28, 1982

[30] Foreign Application Priority Data

Apr. 13, 1981 [SE] Sweden .................. 8102364

[51] Int. Cl.³ .............................................. B65G 25/00
[52] U.S. Cl. .................................. 198/774; 198/468.9
[58] Field of Search .............. 198/775, 774, 485, 457, 198/614, 488

[56] References Cited

U.S. PATENT DOCUMENTS

| 3,473,643 | 10/1969 | Janiske | 198/775 |
| 3,719,270 | 3/1973 | Buddris et al. | 198/774 |
| 3,753,489 | 8/1973 | Tomioka et al. | 198/576 |
| 4,151,907 | 5/1979 | Doty | 198/774 |
| 4,236,626 | 12/1980 | Noe | 198/774 |

FOREIGN PATENT DOCUMENTS

| 1254076 | 5/1964 | Fed. Rep. of Germany . | |
| 2438812 | 2/1975 | Fed. Rep. of Germany . | |
| 2402026 | 7/1975 | Fed. Rep. of Germany . | |
| 2810780 | 9/1979 | Fed. Rep. of Germany . | |
| 1579710 | 8/1969 | France . | |
| 380061 | 9/1964 | Switzerland . | |
| 371989 | 6/1970 | Switzerland . | |
| 1347840 | 2/1974 | United Kingdom . | |
| 1395058 | 5/1975 | United Kingdom . | |
| 504600 | 5/1976 | U.S.S.R. | 198/614 |

Primary Examiner—Joseph E. Valenza
Assistant Examiner—Kyle E. Shane
Attorney, Agent, or Firm—Young & Thompson

[57] ABSTRACT

A conveyor comprises a driven conveyor reciprocably movable in a horizontal direction between two spaced driven supports. The supports move vertically, before and after the horizontal conveyor movement, to raise objects from the driven conveyor and to lower objects onto the driven conveyor. The driven conveyor and the supports have a common drive motor driving a mechanical driven train, the movements of the driven conveyor and the supports being synchronized with each other so that the driven conveyor interrupts its movements when the supports move. The driven conveyor comprises a carriage movable in a frame and coupled to the drive motor via a crank mechanism, in which a first crank connected to the drive motor engages a guide movably mounted in the frame and actuating the carriage. This guide is arranged to be at rest during a portion of the rotational cycle of the crank.

7 Claims, 6 Drawing Figures

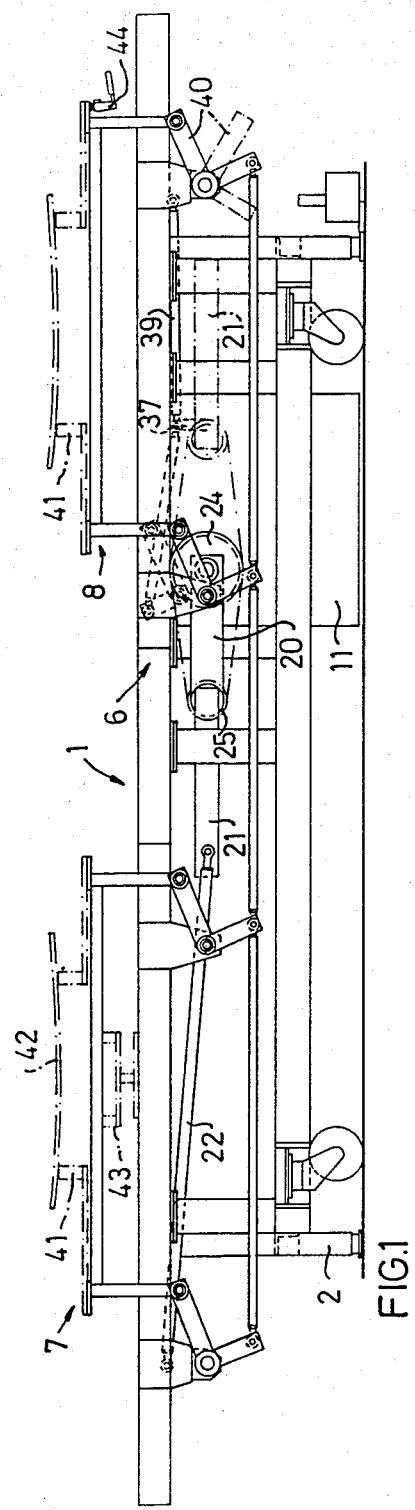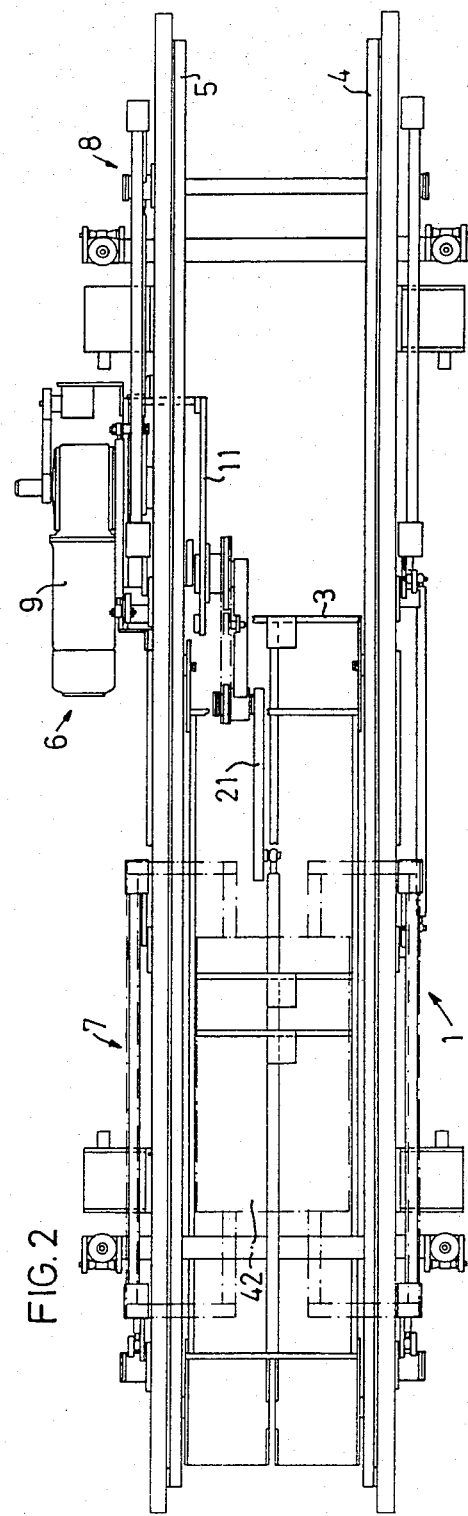

CONVEYOR

The invention relates to a conveyor in which a driven conveyor means is movable essentially in a horizontal plane between two spaced, driven support means movable in synchronization with the movement of said conveyor means, said support means being arranged, prior to and after, respectively, the conveyance of an object by means of the conveyor means, to fix said object in a stationary starting position and in a stationary end position, respectively.

In sheet metal working for example, several presses work in a sequential series, making it sometimes desirable to reduce the manual servicing to a minimum. It is then necessary to place automatic conveyors between the presses. To achieve trouble-free operation it is desirable that the objects to be processed always arrive at their press with a uniform spacial orientation, so as to assure correct feeding into the press. The shape of the objects often makes it difficult however to achieve the desired precision in the conveyance with a continuously moving conveyor for example. Intermittently operating conveyors can change the position of the objects when starting and stopping, resulting in defective products.

The purpose of the invention is to eliminate said disadvantages and to achieve a conveyor which makes reliable conveyance possible of objects with good precision.

This is achieved according to the invention by virtue of the fact that the conveyor means is of reciprocating type, that the support means are movable essentially vertically to lower objects onto and lift objects up from the conveyor means, that the conveyor means and the support means have a common drive motor, and that the movements of the conveyor means and of the support means are synchronized with each other so that the conveyor means interrupts its movement while the support means carry out their movement.

By using a single drive motor, reliable synchronization is achieved between the conveyor means and the support means. The pattern of movement of the support means also makes it possible to deposit and remove objects with good precision while the conveyor means itself is moving. Any positional changes of the object during conveyance on the conveyor means can be easily corrected with the aid of the support means.

Figure 4:
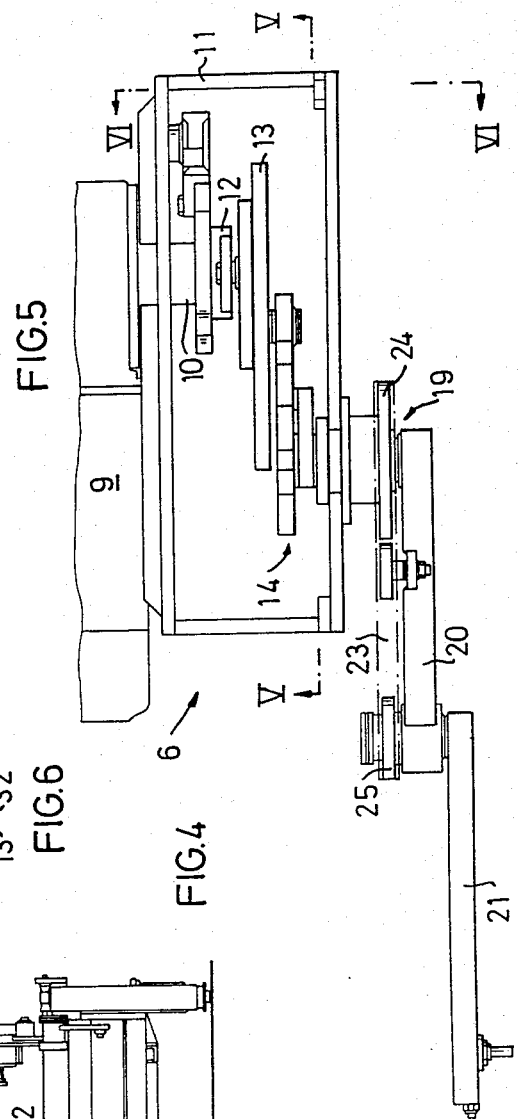
Figure 6:
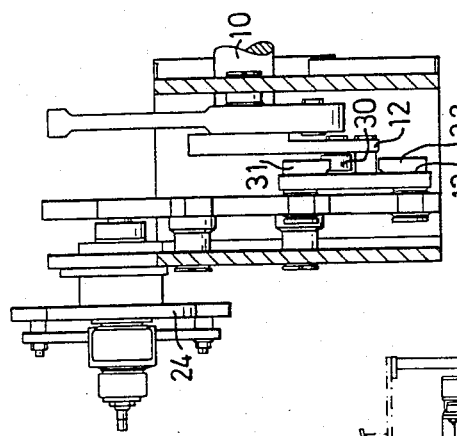
Figure 3:
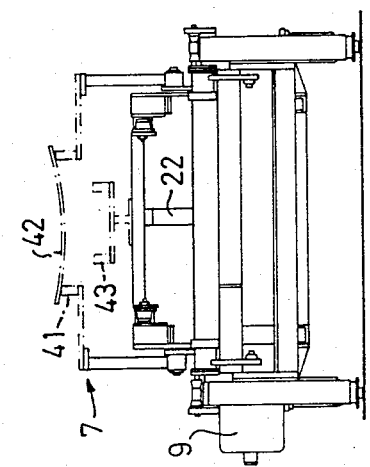

The invention will be described below in more detail with the aid of an embodiment shown on the accompanying drawings, of which FIG. 1 shows a side view of a conveyor according to the invention, FIG. 2 shows a view from above of the conveyor in FIG. 1, FIG. 3 shows an end view of the conveyor in FIGS. 1 and 2, FIG. 4 shows an enlarged partial section of a portion of the conveyor in FIG. 2, FIG. 5 shows a section along the line V—V in FIG. 4, and FIG. 6 shows a section along the line VI—VI in FIG. 4.

As can be seen from FIGS. 1–3, a conveyor 1 according to the invention is provided with a frame 2 which is suitably adjustable to various heights and can be portable. A conveyor means 3 moves horizontally between the ends of said frame. The conveyor means 3 is in this case a carriage mounted in side pieces 4 and 5 in the frame. With the aid of a drive device 6, the carriage can be moved between a starting position (to the left in FIGS. 1 and 2) and an end position (to the right in FIGS. 1 and 2).

At the starting position there is a first support means 7, and at the end position there is a second support means 8. Both of these support means are movably mounted in the frame 2 and are movable essentially vertically between an upper position, shown with solid lines in FIG. 1, and a lower position, shown with dashed lines in FIG. 1.

As can be seen from FIGS. 2 and 3, the two support means 7 and 8 have at least one support portion on either side of the carriage 3. The support means 7 and 8 are both connected to the drive device 6 and move relative to the carriage 3 in a manner which will be described below.

The design of the drive device 6 is revealed in FIGS. 4–6. A motor 9 (FIG. 4), which is suitably an electric motor, is fixed to the frame 2 and drives a shaft 10 which extends into a housing 11 also mounted on the frame 2. The shaft 10 supports at its free end a first crank 12 which engages a guide 13, movably mounted in a parallel arm mechanism 14 comprising two arms 15 and 16 which are swingably mounted in the housing 11. The upper arm 16 carries a guide block 17 for a first end portion 18 of a second crank 19 made as a double crank, which is journalled in the housing 11 and which is only partially rotatable.

A second end portion 20 of the second crank 19 carries a swingably journalled arm 21 which, via a connecting means 22 (see FIG. 1), is in turn articulated to the carriage 3. A drive means 33, suitably in the form of a chain, runs around two wheels 24 and 25, suitably in the form of sprocket wheels. The wheel 24 is non-rotatably fixed to the housing 11, and the wheel 25 is non-rotatably fixed to the arm 21. When the second crank 19 is rotated in a certain direction, the arm 21 will thereby be rotated in the opposite direction.

The guide 13 has an elongated, essentially horizontal slot 26 in which a first contact means 27 runs, here in the form of a roller, on the first crank 12 (see FIG. 5). Between the essentially straight lateral wall portions, the slot 26 has two essentially opposing concave lateral wall portions 28 and 29 which have a radius of curvature corresponding to the radius of movement of the first contact means 27. In FIG. 5, the first contact means 27 runs against the lower lateral wall portion 28. To hold the guide 13 in the position shown, a second contact means 30 on the first crank 12 runs against a suitably shaped upper support 31 (see FIG. 6) on the guide 13. For the second contact means 30 there is also a lower support 32 (see FIG. 6).

The drive device 6 actuates the carriage 3 in the following manner: When the shaft 10 rotates clockwise in the direction of the arrow 33, according to FIG. 5 the first contact means 27 rolls along the concave lower lateral wall portion 28. The guide 13 is thus at rest, which means that the carriage 3 will also be at rest in its left-hand starting position shown in FIGS. 1 and 2. When the first contact means 27 leaves the lower lateral wall portion 28 and enters the left-hand straight portion of the slot 26, the guide 13 is pushed upwards. Via the guide block 17 in the parallel arm mechanism 14, the second crank 19 is thereby rotated in the direction of the arrow 34, i.e. counterclockwise. The second end portion 20 of the second crank 19 will thus be moved downwards in FIG. 1, at the same time that the arm 21 swings clockwise about said second end portion 20, with the result that the carriage 3 initiates a movement to the right in FIG. 1. As the first contact member 27 continues its movement in the left-hand portion of the slot 26, the guide 13 is lifted as the rotation of the second crank 19 continues. When the first contact means 27 first comes into contact with the upper curved lateral wall portion 29, the second crank 19 has rotated through an angle of 180° in the direction of the arrow 34, at the same time that the arm 21 has been rotated through an angle of 180° in the opposite direction. These components have then assumed the position indicated by dash-dot lines in FIG. 1, in which the carriage 3 has reached its end position all the way to the right in FIG. 1.

The carriage 3 will now stand still in its end position while the first contact means 27 rolls along the upper lateral wall portion 29. The return movement is initiated when the first contact means 27 enters the right-hand straight portion of the slot 26. The second crank 19 will now be turned clockwise as the first crank 12 continues its rotation. When the first contact means 27 again comes into contact with the lower curved lateral wall portion 28, the carriage 3 has returned to its starting position and pauses again there.

On the shaft 10 there is a cam 35 fixed relative to the first crank 12. Said cam 35 interacts with a lift arm 36 rotatably mounted in the housing 11, the upper end 37 of said arm being coupled to a mechanism by means of which the support means 7 and 8 can be raised and lowered. In the position shown in FIG. 5, the upper end 37 of the lift arm 36 has just begun a movement in the direction of the arrow 38, i.e. to the right in the drawing, with the result that a number of supporting arms journalled in the frame 2 are made, via a rod 39, to rotate clockwise (as seen in FIG. 1) to lower the support means 7 and 8. This lowering is completed before the first contact means 27 leaves the curved lower lateral wall portion 28. The support means 7 and 8 will thereafter be in the lowered position while the carriage 3 moves from the starting position to the end position. While the carriage 3 is standing still in its end position, the lift arm 36 swings with the aid of the cam 35 back to the position shown in FIG. 5, whereby the support means 7 and 8 return to the upper position shown in FIG. 1. This position is then maintained while the carriage 3 moves back to the starting position, whereafter a new cycle is initiated.

Both of the support means 7 and 8 can have one or more holders 41 for an object 42 to be conveyed. The carriage 3 is also provided with one or more suitable holders 43. These holders should be interchangeable for various types of objects with the aid of special fixing means 44. The conveyor distance can be varied by moving the articulation between the arm 21 and the connecting member 22.

The conveyance of an object proceeds as follows: While the two support means 7 and 8 are in the raised position, an object 42 such as a body part from an adjacent press is fed into the holder 41 on the first support means 7. While the carriage 3 is in its starting position, the two support means are lowered, the first support means being lowered sufficiently so that the object 42 is instead taken over by the holder 43 on the carriage 3. When the carriage 3 has reached its end position, the two support means 7 and 8 are raised, whereby the object 42 is taken over by a suitable holder on the second support means 8. The object is now ready to be advanced to the next operation. At the same time, a new object can be placed on the first support means 7, even during the return movement of the carriage.

The embodiment described above, which can of course be varied by the person skilled in the art in various respects, provides, with the aid of a single motor, a variety of different well-synchronized movements which makes reliable conveyance of objects possible without unintentional spacial reorientation of the objects. Changing the shape of the slot 26 and the cam 35 can provide other types of synchronization than that described here.

I claim:

1. In a conveyor, in which a driven conveyor means (3) is movable essentially in a horizontal plane between two spaced, driven support means (7,8) movable in synchronization with the movement of said conveyor means, said support means being arranged, prior to and after, respectively, the conveyance of an object (42) by means of the conveyor means (3), to fix said object in a stationary starting position and in a stationary end position respectively, the conveyor means (3) being of reciprocating type, the support means (7,8) being movable essentially vertically to lower objects onto and lift objects up from the conveyor means; the improvement in which the conveyor means and the support means have a common drive motor (9) with a mechanical driven train, the movements of the conveyor means and of the support means being synchronized with each other so that the conveyor means interrupts its movement while the support means move, the conveyor means (3) comprising a carriage movable in a frame (2) and coupled to said drive motor (9) via said driven train which includes a crank mechanism (12,19) in which a first crank (12) connected to the drive motor (9) engages a guide (13), movably mounted in the frame and actuating the carriage, said guide being arranged to be at rest during a portion of the rotational cycle of the first crank (12), and support means (7,8) that assume, during the movement of the conveyor means (3) from the starting position to the end position, a bottom, lowered position, and during the return movement of the conveyor means an upper, raised position, the reciprocal movement of the support means (7,8) between the raised and lowered position being controlled by a cam (35) rotating synchronously with the first crank (12).

2. Conveyor according to claim 1, in which said guide (13) has an elongated slot (26) for an end portion of the first crank (12), and said slot (26) has, between essentially straight lateral wall portions, two essentially opposing concave lateral wall portions (28,29) having a radius of curvature corresponding to the rotational radius of the end portion of the first crank, whereby the guide (13) remains stationary during the two segments of the rotational cycle of the first crank when the end portion of the crank is in contact with one of the concave lateral wall portions (28,29).

3. Conveyor according to claim 1, in which the guide (13) is mounted in the frame (2) by means of a parallel arm mechanism (14) and is disposed to actuate the carriage (3) via the parallel arm mechanism and a second crank (19) coupled thereto which is only partially rotatable.

4. Conveyor according to claim 3, in which the second crank (19) is a double crank with first and second end portions (18,20), the first end portion being coupled to the guide (13) via the parallel arm mechanism (14), the second end portion (20) actuating the carriage (3)

via an arm (21) swingably mounted on the second end portion, said arm (21) being connected to the carriage via connecting means (22).

5. Conveyor according to claim 4, in which the arm (21) swings oppositely to the second crank (19) as a function of the movement of the guide (13).

6. Conveyor according to claim 1, in which the conveyor means (3) and the support means (7,8) have means (44) for fixing holders (41,43) for the objects (42) to be conveyed.

7. Conveyor according to claim 1, in which each support means (7,8) has at least one supporting portion on either side of the path of the conveyor means.

* * * * *